United States Patent [19]

Buchenhorner et al.

[11] Patent Number: 5,345,596
[45] Date of Patent: Sep. 6, 1994

[54] METHOD AND APPARATUS FOR ESTABLISHING A COMMUNICATION LINK

[75] Inventors: Michael J. Buchenhorner, Coral Gables; Mohammad M. Ghomeshi, Ft. Lauderdale; Steven C. Shapiro, Lake Worth, all of Fla.

[73] Assignee: Motorola, Inc., Schaumburg, Ill.

[21] Appl. No.: 68,274

[22] Filed: May 26, 1993

Related U.S. Application Data

[63] Continuation of Ser. No. 720,545, Jun. 25, 1991, abandoned.

[51] Int. Cl.$^5$ .................... H04Q 7/02; H04B 7/00; H04B 1/04
[52] U.S. Cl. .................... 455/33.1; 455/54.2; 455/56.1; 455/126; 379/59
[58] Field of Search ........... 455/9, 10, 33.1, 33.2, 455/34.2, 54.1, 54.2, 56.1, 53.1, 126, 127, 116, 15, 14, 63, 67.1, 62, 67.3; 379/58, 59, 60, 63, 37, 45, 49; 340/539, 505, 506

[56] References Cited

U.S. PATENT DOCUMENTS

| | | | |
|---|---|---|---|
| 3,986,119 | 10/1976 | Hemmer, Jr. et al. | 455/15 |
| 4,485,486 | 11/1984 | Webb et al. | 455/33 |
| 4,563,680 | 1/1986 | Nakajima | 340/825.44 |
| 4,577,182 | 3/1986 | Millsap et al. | 340/539 |
| 4,716,407 | 12/1987 | Borras et al. | 455/54.2 |
| 4,724,538 | 2/1988 | Farrell | 379/59 |
| 4,783,780 | 11/1988 | Alexis | 370/95 |
| 4,794,635 | 12/1988 | Hess | 379/60 |
| 4,797,948 | 1/1989 | Milliorn et al. | 455/54 |
| 4,835,731 | 5/1989 | Nazarenko et al. | 455/14 |
| 4,853,972 | 8/1989 | Ueda et al. | 455/83 |
| 4,866,788 | 9/1989 | Mouly et al. | 455/9 |
| 4,881,271 | 11/1989 | Yamauchi et al. | 455/56 |
| 4,953,198 | 8/1990 | Daly et al. | 379/61 |
| 4,989,290 | 1/1991 | Levine et al. | 455/33.2 |
| 5,040,205 | 8/1991 | Kunihiro | 379/61 |
| 5,050,234 | 9/1991 | Ohteru | 455/34 |
| 5,101,501 | 3/1992 | Gilhousen et al. | 455/33.2 |
| 5,119,508 | 6/1992 | Shamasundara | 455/234 |
| 5,128,959 | 7/1992 | Bruckert et al. | 455/33.2 |
| 5,129,098 | 7/1992 | McGirr et al. | 455/126 |

OTHER PUBLICATIONS

Spectra Conventional Radio System Operator's Manual, Motorola.

*Primary Examiner*—Reinhard J. Eisenzopf
*Assistant Examiner*—Lisa Charouel
*Attorney, Agent, or Firm*—Michael J. Buchenhorner; M. Mansour Ghomeshi

[57] ABSTRACT

A method and apparatus whereby a communication unit (10) transmits a first communication channel request signal at a first power level. If a communication link with a base site (12) is not established within a predetermined period, the communication unit transmits a second communication channel request signal at a second level which is higher than the level of the first communication channel request signal. This process may be continued for a predetermined number of times or until a communication link is established. Thus, the probability that a nearby base site, rather than a more distant base site, grants the communication channel is greatly enhanced.

5 Claims, 4 Drawing Sheets

METHOD AND APPARATUS FOR ESTABLISH A COMMUNICATION LINK

This is a continuation of application Ser. No. 07/720,545, filed Jun. 25, 1991, and now abandoned.

TECHNICAL FIELD

This invention relates generally to communication systems and more specifically to radio telephone communication systems.

BACKGROUND

Radio telephone communication systems (such as second generation cordless telephone, or Digital European Cordless Telephone) comprise a plurality of base sites (also known as telepoints) and a plurality of radio telephones (also known as handsets). Taking second generation cordless telephone (CT2) as an example, the users of the CT2 radio telephones communicate with users of other radio telephones or subscribers in a public switched telephone network (PSTN) via the base sites. A large number of base sites is desirable in certain areas (such as shopping malls) where many persons are likely to place radio telephone calls because that eliminates gaps in coverage by the base site network. However, these base sites are not synchronized with each other. When a radio telephone user wishes to place a call, he or she causes the radio telephone unit to transmit a channel request signal. Since each base site is monitoring the channels of the CT2 system independently, the base site that grants the channel request is not necessarily the one closest to the radio telephone unit transmitting the channel request signal. That may be a problem because the user may move out of range of the base site, thus causing the communication link to be dropped. On the other hand, if the nearest base sites had made the channel grant, the radio telephone user would have been able to continue the communication while moving within a greater area. Accordingly, a need exists for a method and apparatus for acquiring a communication channel that overcomes the above problem.

SUMMARY OF THE INVENTION

Briefly, according to the invention, a method and apparatus are provided whereby a communication unit transmits a first communication channel request signal at a first power level. If a communication link with a base site is not established within a predetermined period, the communication unit transmits a second communication channel request signal at a second level which is higher than the level of the first communication channel request signal. This process may be continued for a predetermined number of times or until a communication link is established. Thus, the probability that a nearby base site, rather than a more distant base site, grants the communication channel is greatly enhanced.

DETAILED DESCRIPTION OF THE PREFERRED EMBODIMENT

Figure 1:
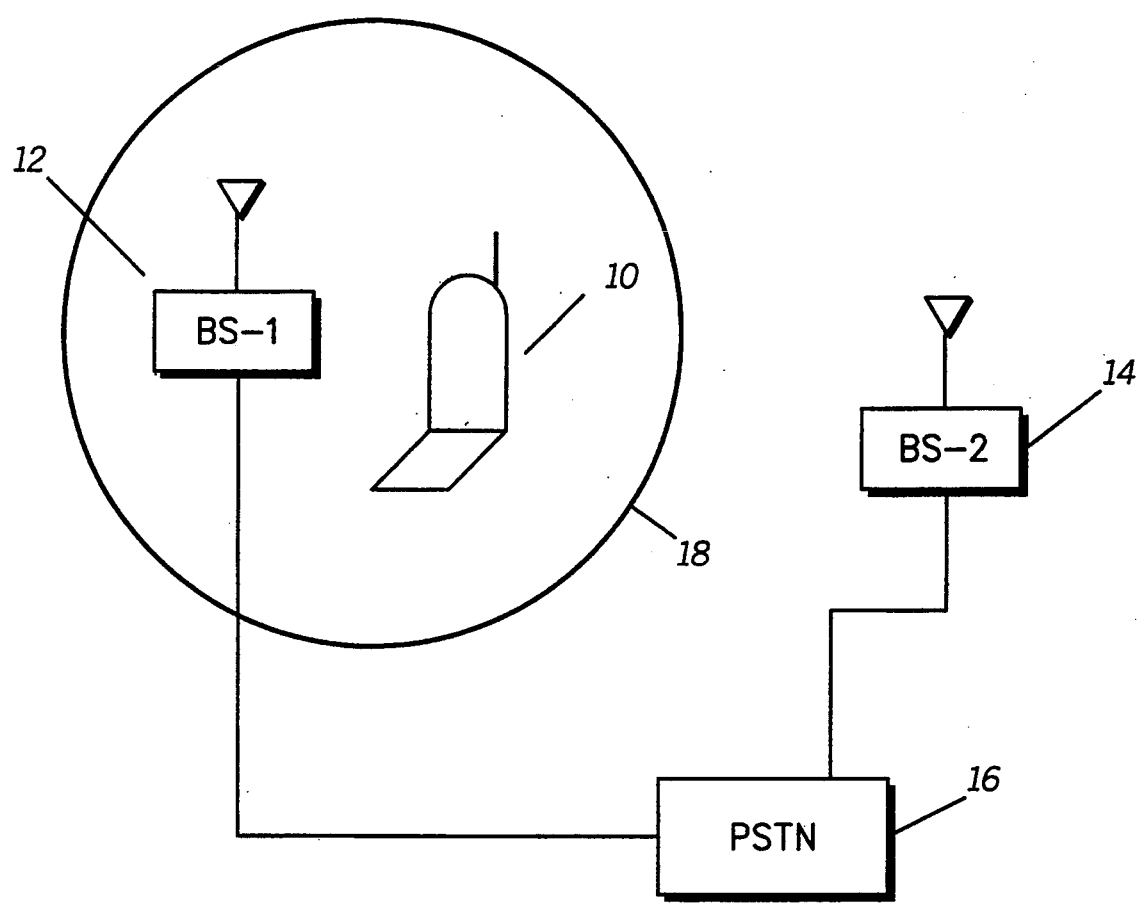
FIG. 1 is a simplified block diagram of a communication system in a accordance with the invention.

Referring to FIG. 1, there is shown a simplified block diagram of a communication system in accordance with the invention. A communication unit 10 (preferably, a radio telephone handset) operates in a CT2 communication system that comprises at least first and second base sites, 12 and 14, respectively. The system may also comprise several other base sites, communication units, and a public switched telephone network (PSTN) 16. The communication unit 10 is closer to the first base site 12 than to the second base site 14. When the user of the communication unit 10 wishes to make a call, he or she causes the communication unit to transmit a first channel request signal (which includes the unit's identification number) requesting a communication channel. The first channel request signal has a power level that is a predetermined fraction of the maximum output power of the communication unit 10. The fraction of the maximum transmit power is selected in accordance with a preferred minimum distance from the base site granting the communication channel (to establish the sought communication link). The preferred minimum distance from the base site is represented by area 18. In this example, only base site 12 is within the area 18, thus only base site 12 receives the first channel request signal. Therefore, base site 12 (rather than base site 14) grants the communication unit 10 the communication channel, thus solving the problem that would have been caused by the more distant base site 14 granting the communication channel. Once the communication link is established, the communication unit 10 operates at its maximum transmit power.

Figure 2:
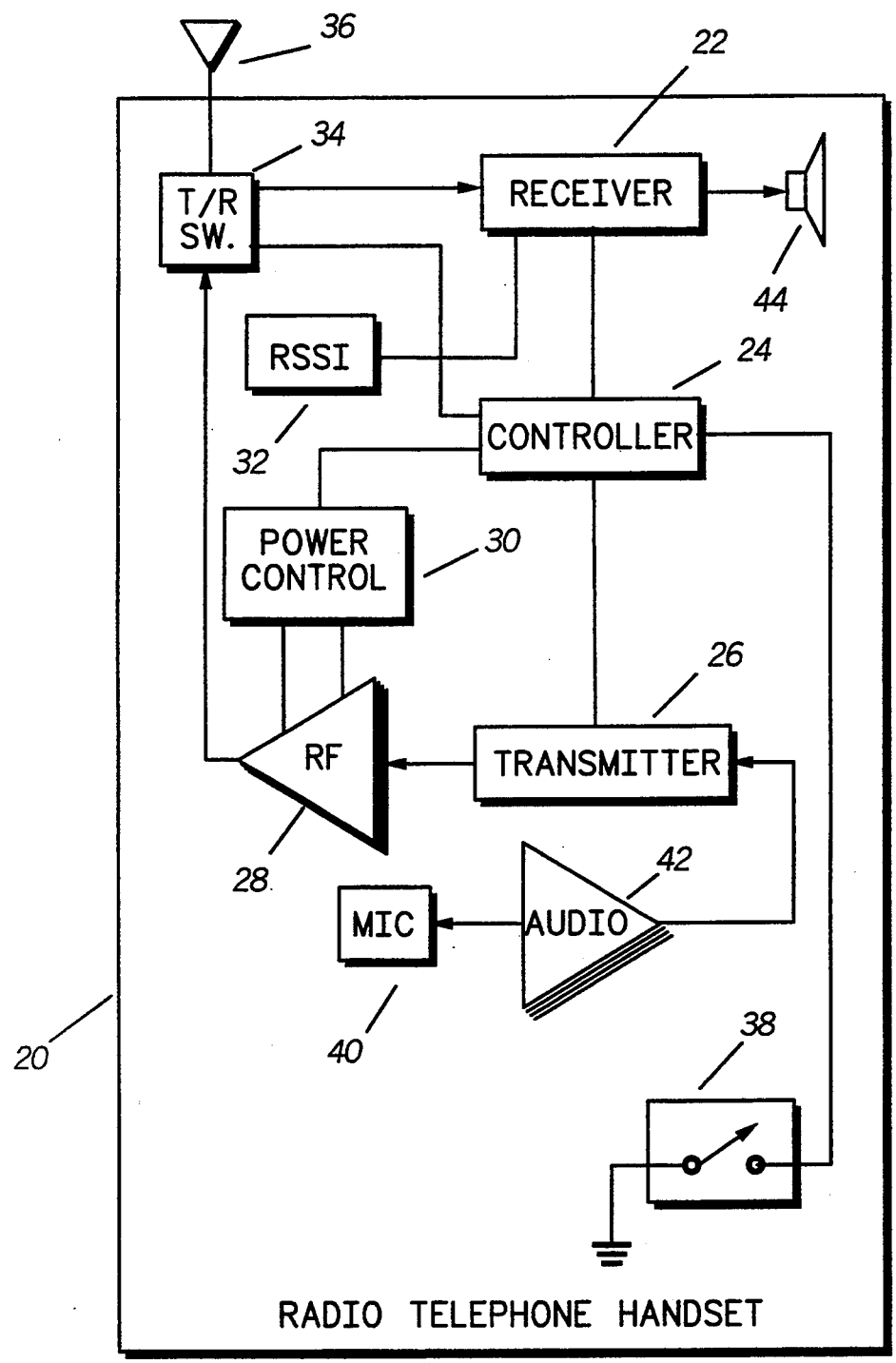
FIG. 2 is a simplified block diagram of a base site in accordance with the invention.

Referring to FIG. 2, a radio telephone handset 20, in accordance with the invention, is shown in block diagram form. The handset 20 comprises a receiver 22 coupled to an antenna 36 via an antenna switch 34, a received signal strength indicator (RSSI) 32, a controller 24 (e.g., a conventional microprocessor), a transmitter section 26, and a power radio-frequency amplifier 28, and a power level control circuit 30 (e.g., a feedback circuit with adjustable resistance) for adjusting the gain or output power level of the RF amplifier 28. The RSSI detector 32 is used to determine the received signal strength (RSS) level of signals received (e.g., from a base site). A conventional microphone 40 and audio amplifier 42 receive voice signals and provide representative audio signals to the transmitter 26. A channel request switch 38 is coupled to the controller 24 so that the transmission of signal request signals is initiated when the switch 38 is activated. This switch 38 may be mechanically activated by, for example, opening a flap in the handset 20. A speaker 44 provides sound signals to the user.

Figure 3:
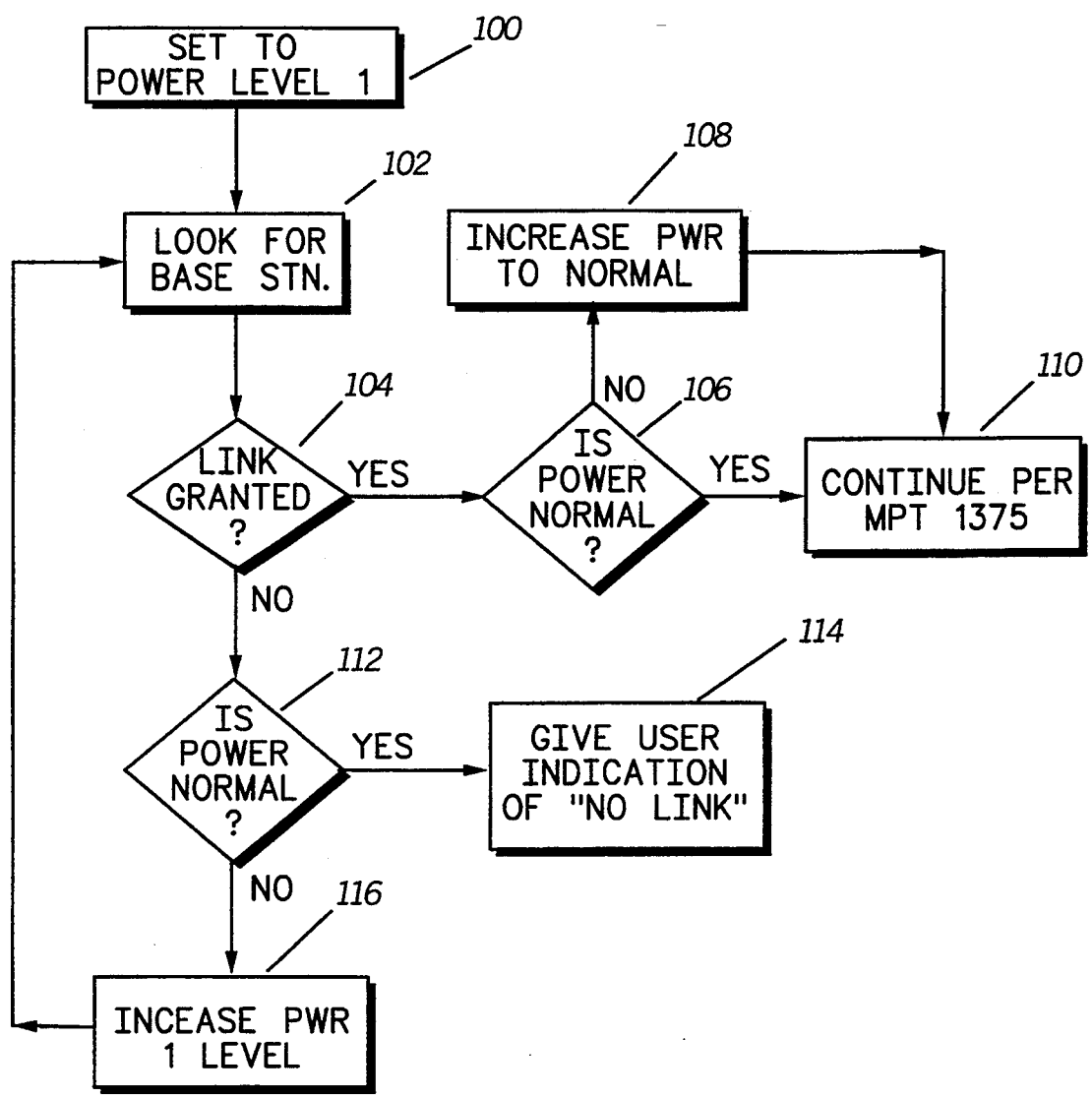
FIG. 3 is a flow chart of a channel acquisition method in accordance with the invention.

Referring to FIG. 3, them is shown a flow chart of a channel acquisition method for use in a CT2 communication system, in accordance with the invention. In step 100, a radio telephone handset (e.g., handset 10) has its output power level set to power level 1. Power level 1 is preferably very low (e.g., 0.16 miliwatts, or −18 dB from the normal output power) to attempt establishing a communication link with the closest base site. In step 102, the handset 10 looks for a base site by transmitting a first communication channel request at the first power level. In decision, 104 a determination is made as to whether a communication link has been granted. If a communication link has been granted, then a decision 106 is made to determine whether the transmit power is at the normal operating level. If the transmit power is not at the normal level, it is increased to the normal level in step 108. Then in step 110, operation continues in accordance the protocol set forth in the Document of Common Air InteRace MPT 1375 (Department of Trade and Industry).

If it were determined in decision 104 that a communication link has not been granted, a further decision 112 is made to determine whether the present power level is normal. If it is normal, the user is given a "no link" indication in step 114. If the power level is not normal, the transmit power level is increased in step 116, and the process returns to step 102.

In this embodiment, there could be made a predetermined number of attempts to establish a communication link, each attempt using an incremented transmit power level. For example, a second attempt could be at 0.63 miliwatts ERP (−12 dB from normal), a third attempt at 2.50 miliwatts ERP (−6 dB from normal), and a fourth attempt at 10.00 miliwatts ERP (which is normal under the CA1). An advantage of this approach is that under the CT2 protocol, the handset will not switch channels after 750 miliseconds.

Figure 4:
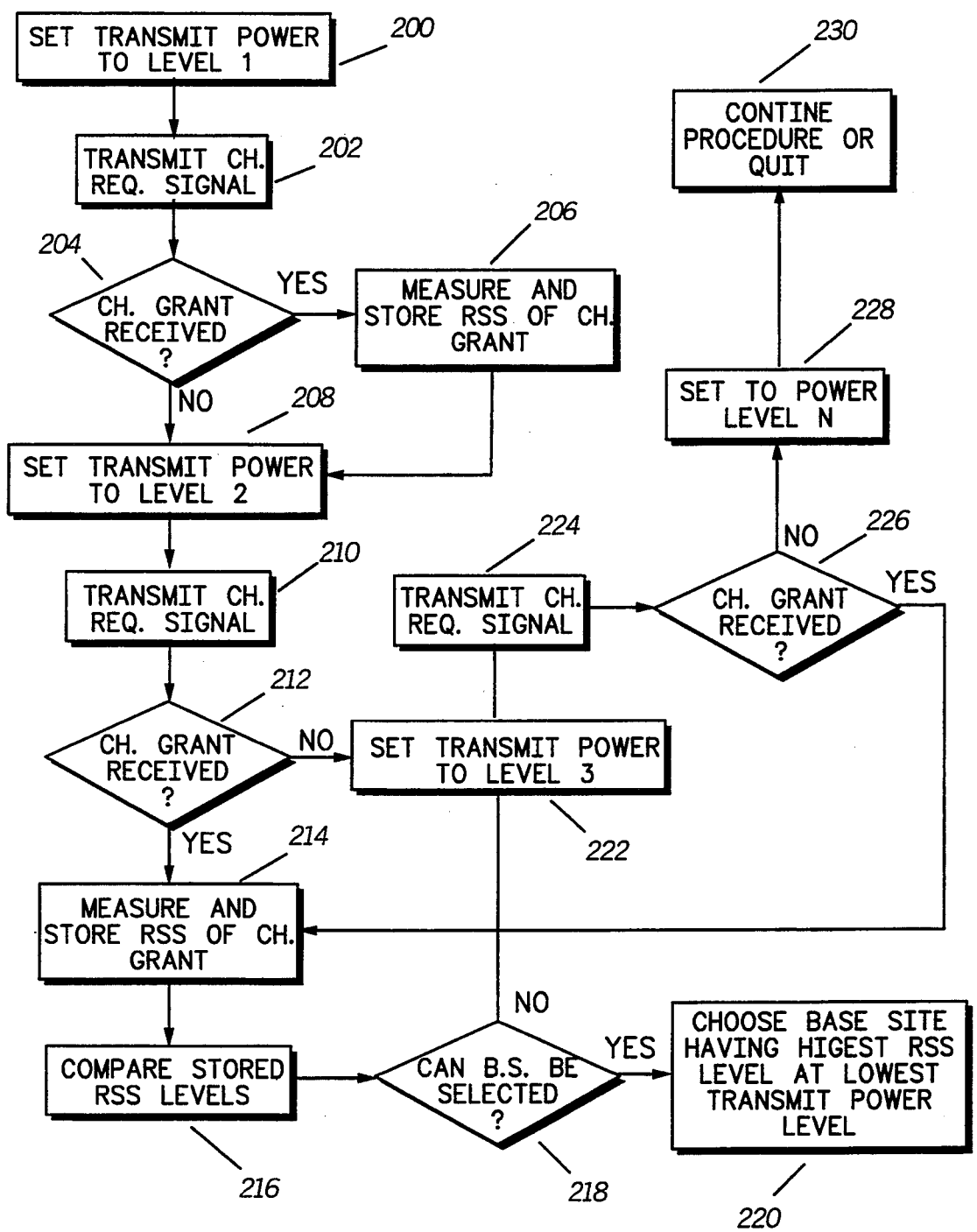
FIG. 4 is a flow chart of another channel acquisition method in accordance with the invention.

Referring to FIG. 4 there is shown a flow chart of another channel acquisition method in accordance with the invention. In certain circumstances, the first channel grant, responsive to a channel request signal may not be the best base site to establish a communication link with the handset requesting the link. For example, there may have been a temporary obstruction blocking the best base site from the handset as it transmitted its channel request signal. Thus, it may be desirable not to accept the first channel grant received. In step 200, the transmit power of the radio telephone handset is set to level 1. In step 202 the radio telephone handset transmits a first channel request signal at level 1 (which is a fraction of the available maximum or normal transmit power). In decision 204 the radio telephone handset determines whether a channel grant signal is received from a base station. This channel grant signal may also be any other signal that may be used to determine RSS of signals transmitted by a particular base site.

If a channel grant signal has been received, the handset measures and stores the received signal strength level (the RSS level) of the received channel grant signal in step 206. Then, in step 208 the transmit power is set at level 2 which is higher than level 1, and a second channel request signal is transmitted block 210.

In step 212, a second decision is made to determine whether any channel grant signals have been received in response to the second channel request signal. If a channel grant has been received, the handset measures and stores (step 214) the RSS of the received channel grant signal(s). Then in step 216 the handset compares the RSS level of each received channel grant signal with the levels of any other channel grant signals that have been received (and stored).

In decision 218, the handset determines whether a base site can be selected on the basis of RSS and transmit power level. Some situations may be ambiguous, thus resulting in a "No" answer. For example, if the RSS level of the second channel grant signal is higher than that of the first channel grant signal there is no clear best site, thus a third comparison must be made. Accordingly, if the answer in decision 218 is "No," the transmit power level is increased to a third level 3, in step 222. Then a third channel request signal is transmitted in step 224.

A third decision 226 is then made to determine whether any channel grant signals have been received in response to the third channel request signal. If none are received, the power level may be increased N times, block 228 and the process may continue in step 230, or the process may be stopped at this point. If a channel grant or grants are received in response to the third channel request, the process continues to step 214. At this point there should be sufficient information to make a decision (218) on the best base site.

If the first and second channel request signals do not result in reception of a channel grant signal, and a channel grant signal is received in response to the third channel request, then the third channel grant would be accepted, thus establishing a link.

In step 220 the handset determines and chooses the base site having the highest RSS at the lowest transmit power level, thus establishing a communication link.

This method of selecting a base station substantially increases the probability that the nearest base grants the communication link.

What is claimed is:

1. In a communication system having a plurality of base sites coupled to a telephone network for independently allocating a communication channel for use by a communication unit in response to a channel request signal transmitted from the communication unit in an attempt to gain allocation of the communication channel to communicate via the telephone network, and wherein a particular base site is an optimum base site in the sense that it is closer to the communication unit transmitting the channel request signal, a method facilitating the allocation of a communication channel from the particular base site comprising the communication unit steps of:
   (a) transmitting a first channel request signal at a first power level;
   (b) receiving a first channel grant signal from a first base site of the plurality of base sites having a first signal strength level;
   (c) measuring and storing a first value representing the first signal strength level;
   (d) transmitting a second channel request signal at a second power level that is greater than the first power level;
   (e) receiving a second channel grant signal having a second signal strength level from a second base site of the plurality of base sites;
   (f) measuring and storing a second value representing the second signal strength level;
   (g) comparing the first value representing the first signal strength level with the second value representing the second signal strength level to determine which of the channel grant signals has a greater signal strength; and
   (h) selecting the particular base site based on the stored values representing the signal strength levels of the first and second base sites and on the first and second power levels.

2. A communication unit for operating in a communication system having a plurality of base sites coupled to a telephone network and capable of independently allocating a communication channel for use by the communication unit in response to a channel request signal transmitted from the communication unit in an attempt to gain allocation of the communication channel to communicate via the telephone network, and wherein a particular base site is an optimum base site in the sense that it is closer to the communication unit transmitting the channel request signal, the communication unit comprising:

transmitter means;

means for adjusting the transmitter means to transmit the channel request signal at variable power levels;

receiving means for receiving channel grant signals from at least two of the plurality of base sites to provide received channel grant signals;

means for measuring a value representing signal strength of each of the received channel grant signals;

control means for increasing the variable power level of the transmitter means in response to the receiving means to transmit multiple channel request signals at the increasing variable power levels; and means for selecting the particular base site based on the values representing the signal strengths of the received channel grant signals.

3. The communication unit of claim 2 wherein the means for measuring includes;

a received signal strength indicator.

4. In a communication system having a plurality of base sites for independently allocating a communication channel for use by a communication unit in response to a channel request signal from the communication unit, a method facilitating the use of a particular base site comprising the communication unit steps of:

(a) transmitting a first channel request signal at a first power level;

(b) receiving a first channel grant signal from a first base site of the plurality of base sites having a first signal strength level;

(c) measuring and storing a first value representing the first signal strength level;

(d) transmitting a second channel request signal at a second power level that is greater than the first power level;

(e) receiving a second channel grant signal having a second signal strength level from a second base site of the plurality of base sites;

(f) measuring and storing a second value representing the second signal strength level;

(g) comparing the first value representing the first signal strength level with the second value representing the second signal strength level to determine which of the channel grant signals has a greater signal strength; and (h) selecting the particular base site based on the stored values representing the signal strength levels of the first and second base sites and on the first and second power levels.

5. A communication system, comprising:

a telephone network;

a plurality of base sites coupled to the telephone network and for independently allocating a communication channel for use by a communication unit in response to a channel request signal transmitted from the communication unit in an attempt to gain allocation of the communication channel to communicate via the telephone network, wherein a particular base site is an optimum base site in the sense that it is closer to the communication unit transmitting the channel request signal; and a plurality of communication units for communicating via the telephone network coupled to the base sites, wherein at least one of the communication units include:

transmitter means;

means for adjusting the transmitter means to transmit the channel request signal at variable power levels;

receiving means for receiving channel grant signals from at least two of the plurality of base sites to provide received channel grant signals;

means for measuring a value representing signal strength of each of the received channel grant signals;

control means for increasing the variable power level of the transmitter means in response to the receiving means to transmit multiple channel request signals at the increasing variable power levels; and means for selecting the particular base site based on the values representing the signal strengths of the received channel grant signals.

* * * * *